No. 675,284. Patented May 28, 1901.
M. B. MATTHIESSEN.
MACHINE FOR HALVING BISCUITS.
(Application filed Nov. 8, 1900.)

(No Model.)

UNITED STATES PATENT OFFICE.

MATTHIAS BAHNE MATTHIESSEN, OF NEUMÜNSTER, GERMANY.

MACHINE FOR HALVING BISCUITS.

SPECIFICATION forming part of Letters Patent No. 675,284, dated May 28, 1901.

Application filed November 8, 1900. Serial No. 35,833. (No model.)

*To all whom it may concern:*

Be it known that I, MATTHIAS BAHNE MATTHIESSEN, expert, a subject of the King of Prussia and Emperor of Germany, residing at Moltkestrasse 18, Neumünster, in the Kingdom of Prussia and Empire of Germany, have invented certain new and useful Improvements in Machines for Halving Biscuits, of which the following is a full, clear, and exact description.

This invention refers to a machine by means of which baked biscuits of a cylindrical or other similar shape can, before roasting, be cut across their thickness—namely, perpendicularly to the axis of the cylinder.

The accompanying drawings illustrate my improved machine.

Figure 1:
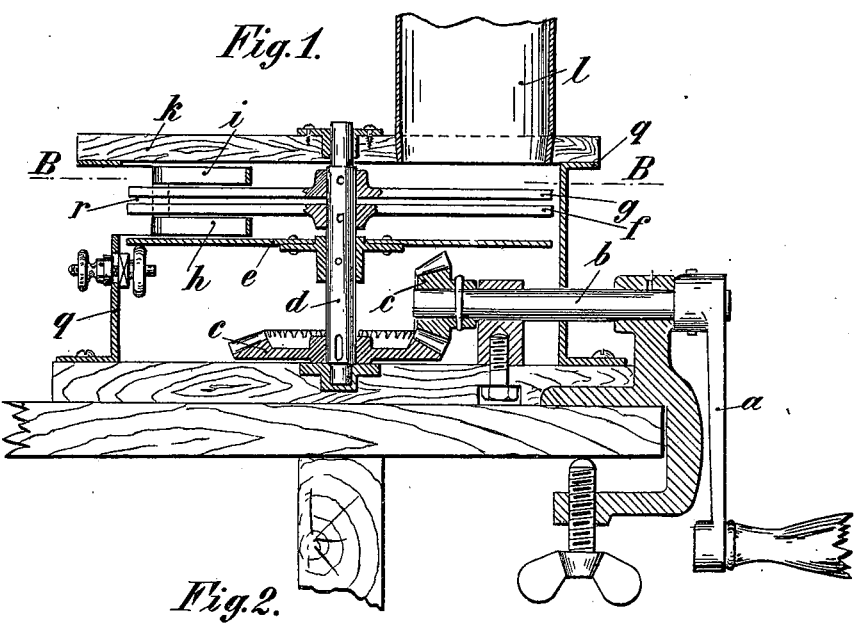
Figure 2:
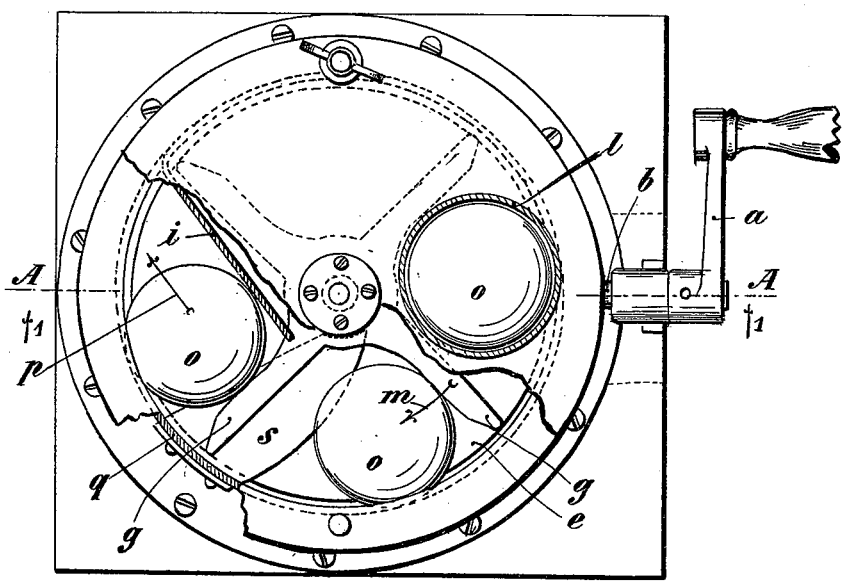

Figure 1 represents a central vertical section on the line A A of Fig. 2 viewed in the direction of the arrows 1. Fig. 2 is a top view, partly in horizontal section, on the line B B of Fig. 1.

By means of a crank $a$ the shaft $b$, the two bevel-wheels $c$, the shaft $d$, a plate $e$, and two star-wheels $f$ and $g$ are set in rotary motion. The star-wheels $f$ and $g$ are fixed to the vertical shaft $d$, with the arms of the upper wheel $g$ directly over those of the lower wheel $f$, and the said star-wheel arms run between the prongs $h$ and $i$ of a fixed discharging-fork located, respectively, between the plate $e$ and the lower star-wheel $f$ and the lid $k$ of the machine and the upper star-wheel $g$. The lid $k$ is provided with a tube $l$ for introducing the biscuits. As soon as the two star-wheels take the position shown in Fig. 2 the biscuit drops between the arms down upon the plate $e$, and in consequence of the rotation of the star-wheels it is carried around at once in the direction of the arrow $m$ in Fig. 2, the thickness of the biscuit being less than the height between the lid $k$ and the plate $e$. Three biscuits are shown at $o$ $o$ $o$ in Fig. 2. In the space between the two star-wheels $f$ and $g$ a fixed knife $s$ projects inward from the case $c$ of the machine, which knife, when the star-wheels revolve, passes between them through the slit or space $r$, Fig. 1. The biscuits are thus driven by the star-wheel arms, as shown in Fig. 2, against the fixed knife $s$, as shown in Fig. 2, and cut across horizontally, and finally the two halves, by the action of the star-wheels and the forks $h$ and $i$, are discharged from the machine in the direction of the arrow $p$.

What I claim as new, and desire to secure by Letters Patent, is—

The combination of the rotatable star-wheels $f$, $g$, supporting-plate $e$; fixed knife $s$, located between the two star-wheels; and the fixed discharging-arms $h$ and $i$ below and above the star-wheels respectively; substantially as shown and described.

In witness whereof I subscribe my signature in presence of two witnesses.

MATTHIAS BAHNE MATTHIESSEN.

Witnesses:
J. RÖPKE,
H. MÖLLER.